United States Patent [19]

Harashima et al.

[11] Patent Number: 4,667,585
[45] Date of Patent: May 26, 1987

[54] BEVERAGE BREWING APPARATUS

[75] Inventors: Ikuo Harashima, Maebashi; Isao Morimura, Azuma, both of Japan

[73] Assignee: Sanden Corporation, Gunma, Japan

[21] Appl. No.: 758,404

[22] Filed: Jul. 24, 1985

[30] Foreign Application Priority Data

Jul. 30, 1984 [JP] Japan .................. 59-115005[U]

[51] Int. Cl.$^4$ ............................................. A47J 31/00
[52] U.S. Cl. ................................. 99/289 R; 99/287
[58] Field of Search .............. 99/289 R, 287, 297, 99/289 D, 289 P; 426/433; 277/152, 153

[56] References Cited

U.S. PATENT DOCUMENTS

| | | | |
|---|---|---|---|
| 3,292,526 | 12/1966 | Heier | 99/289 |
| 3,573,860 | 4/1971 | Bentzman | 99/289 |
| 3,660,117 | 5/1972 | Neely | 99/289 |
| 4,133,542 | 1/1979 | Janian | 277/152 |
| 4,252,352 | 2/1981 | Scannell | 277/152 |

Primary Examiner—Robert W. Jenkins

Attorney, Agent, or Firm—Banner, Birch, McKie & Beckett

[57] ABSTRACT

A brewing apparatus includes a vertically movable cylinder with an open top and bottom, a piston mounted for reciprocation down into such cylinder and a heated liquid supply device for discharging brewing liquid into the open top of the cylinder. A brewing cavity is horizontally reciprocal beneath the cylinder between a brewing position and a discharge position. A ground beverage material supply delivers material into the brewing cavity when the cavity is disposed at a material supplying position located intermediate the brewing position and the discharge position. A seal element which is disposed on the outer peripheral surface of the piston to obtain sealing between the piston and cylinder comprises a ring portion affixed to the piston and the flange portion extending radially outwardly from the end portion of the ring portion. A cut out space is formed on the inner surface of the flange portion which connects with the ring portion.

2 Claims, 6 Drawing Figures

BEVERAGE BREWING APPARATUS

BACKGROUND OF THE INVENTION

This invention relates to a beverate brewing apparatus, and more particularly, to improvement of the sealing conditions between a brewing liquid cylinder and a piston in such apparatus during a brewing operation.

Beverage brewing apparatus suitable for use in a vending machine for preparing single cup quantities of beverages from a beverage material is well known in the prior art. For example, U.S. Pat. No. 3,349,690 issued to William Heier discloses one construction for such a brewing apparatus.

Referring to FIG. 1 on the drawings, the basic construction and brewing cycle for a prior art apparatus will be described. Frame 1 of the apparatus supports a vertically movable open-bottom cylinder 2 which has the bottom opening covered by a filter member 3. A vertically movable piston 4 is disposed within cylinder 2 and relative movement between cylinder 2 and piston 4 is created by operation of a cam member 5 driven by motor 6. One end opening of a duct 7 is connected with a water tank (not shown) through an electromagnetic valve 9, this end opening being closely placed above the upper opening of cylinder 2 to supply hot water into cylinder 2. A brewing cavity 10, which is generally reciprocal horizontally between a brewing position (this position being shown by solid lines in FIG. 1) and a rest position (this position being shown by dot-dash lines in FIG. 1), is placed beneath the cylinder 2 and sealed with the lower portion of cylinder 2 in the brewing position.

The prior art apparatus is also provided with a coffee hopper 11 which is connected with a canister 12 for receiving a charge of coffee. The ground coffee fills canister 12 which is provided with suitable feed means to deliver a predetermined quantity of fresh ground coffe into hopper 11 at a point prior to the start of the brew extracting operation.

In this apparatus, brewing cavity 10, at the start of the brewing cycle initiated by a coin operated switch for example, moves horizontally toward the brewing position from the rest position to a place beneath the bottom opening of cylinder 2. During this horizontal movement, the ground coffe is supplied into the brewing cavity 10 through coffee hopper 11 at a supply position (this position being indicated by dotted line in FIG. 1). When brewing cavity 10 is properly aligned beneath the cylinder 2, due to the operation of cam member 5, cylinder 2 moves downwardly into tight engagement with cavity 10. This forms a chamber which is filled with hot water supplied through duct 7.

Thereafter, piston 4 moves downwardly to force the water through the filter member 3 into the ground coffee in cavity 10 and through an outlet duct 13 to a cup 14 placed at a dispensing station. Before introducing coffee into the cup, the extracted coffee would be mixed with a suitable amount of sugar and/or cream, both of which are supplied from canisters 15 and 16, respectively. Thereafter, the brewing cavity 10 containing the spent coffee grounds is moved to its rest position and the grounds in brewing cavity 10 are discarded at a position which is disposed just before the rest position is reached. When brewing cavity 10 is returned to its rest position, one brewing cycle has been completed.

During the brewing cycle, particularly during the extracting operation, the sealing between the inner surface of cylinder 2 and outer peripheral surface of piston 4 should be very good to effect the most favorable extracting operation. Therefore, as clearly shown in FIGS. 2 and 3, piston 4 is provided with a sealing member 17 at its outer peripheral surface. This sealing member 17 comprises, as shown in FIGS. 2 and 3, a ring portion 171 fitted on the outer peripheral surface of piston 4 and a seal portion 172 extending outwardly from ring portion 171. On the other hand, cylinder 2 is normally formed by an extrusion process. Therefore, the outer diameter of the bottom portion of cylinder 2 is slightly smaller than the outer diameter of the upper portion of cylinder 2, i.e., the wall surface of cylinder has a slant angle $\theta_1$ related to a vertical plane, as shown in FIG. 3.

With this construction of seal element 17 and cylinder 2, as piston 3 moves downward, the friction force between the inner surface of cylinder 2 and seal element 17 increases, and finally the outer edge of seal portion 172 becomes partly turned up by the friction contact between cylinder 2 and seal element 7. The turned up portion creates a gap between the cylinder and seal element such that the extracting operation becomes inefficient or defective.

SUMMARY OF THE INVENTION

It is a primary object of this invention to provide an improved beverage brewing apparatus which assures a favorable and efficient extracting operation.

It is another object of this invention to provide a beverage brewing apparatus in which the durability of the seal element disposed on the piston to effect sealing is improved.

It is still another object of this invention to provide a beverage brewing apparatus capable of easy replacement on existing apparatus to improve the sealing problem without basic modification of the original apparatus construction.

Beverage brewing apparatus according to this invention includes a vertical movable cylinder which has an open top and an open bottom. A piston member is reciprocally disposed within the cylinder. Brewing liquid supply means which has a discharge opening positioned to discharge brewing liquid into the open top of the cylinder is connected to a liquid heating tank in which the brewing liquid is stored. A brewing cavity is disposed beneath the cylinder to be horizontally reciprocal between a brewing position and a discharge position. This cavity is tightly engaged with the open bottom of the cylinder to form the brewing chamber when disposed in the brewing position. Ground beverage material is supplied into the brewing cavity through a ground material supply means when the brewing cavity is disposed at the ground material supply position.

A seal element which is disposed on an outer peripheral surface of the piston to secure sealing between the piston and cylinder comprises a ring portion fitted on the piston and a flange portion extending radially outwardly from an end portion of the ring portion. A cut out portion is formed on the inner surface of the flange portion which connects with the ring portion.

Further objects, feature and other aspects of this invention will be understood from the detailed description of a preferred embodiment of this invention while referring to the annexed drawings.

DETAILED DESCRIPTION OF THE PREFERRED EMBODIMENT

Figure 1:
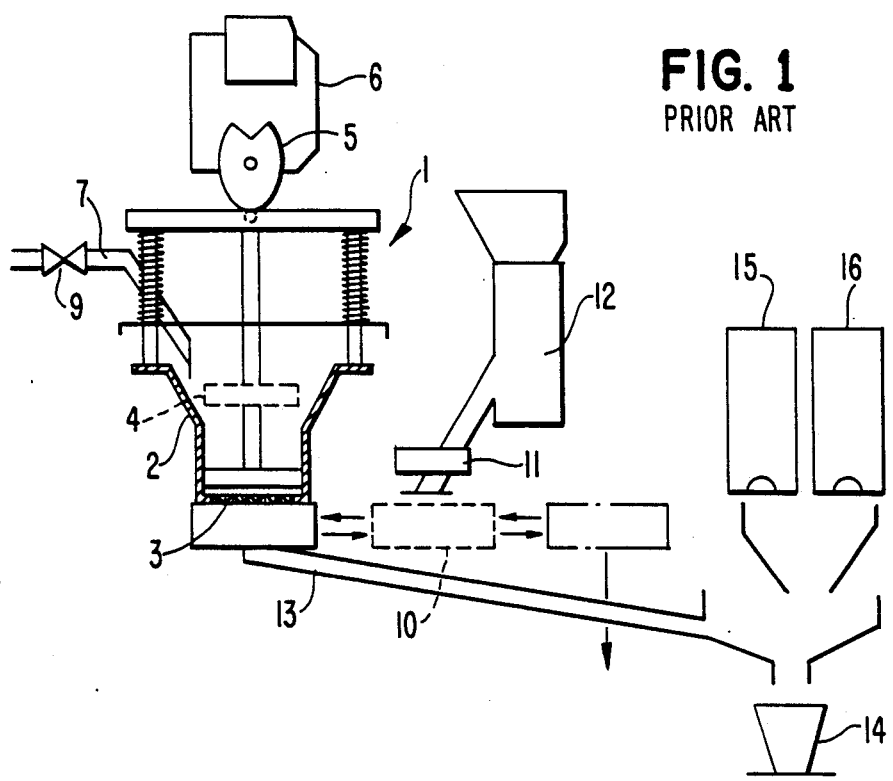
FIG. 1 is a diagramatic view of a prior art brewing apparatus to illustrate the basic construction and brewing cycle.
Figure 2:
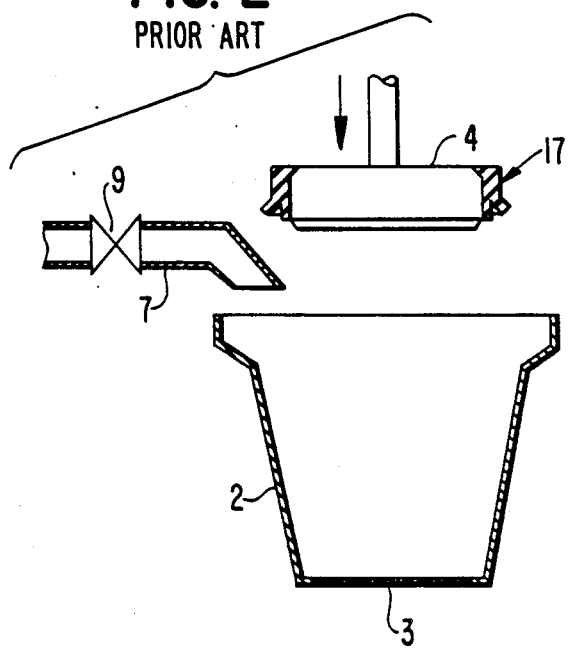
FIG. 2 is a schematic sectional view of a main portion of FIG. 1.
Figure 3:
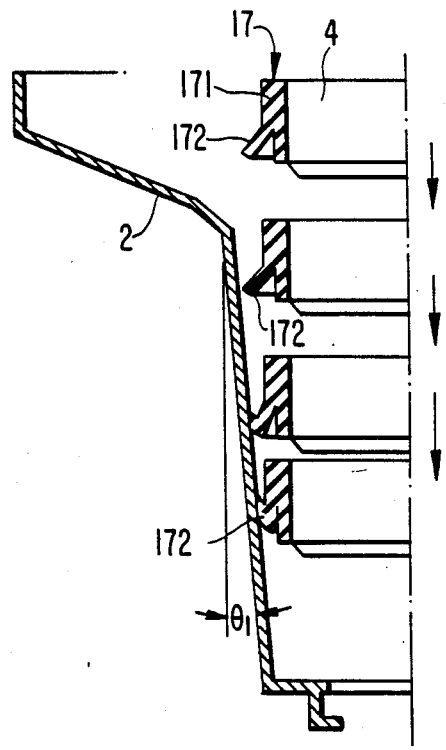
FIG. 3 is a diagramatic view of a main portion of the brewing apparatus to illustrate successive stages of movement of the sealing element.
Figure 4:
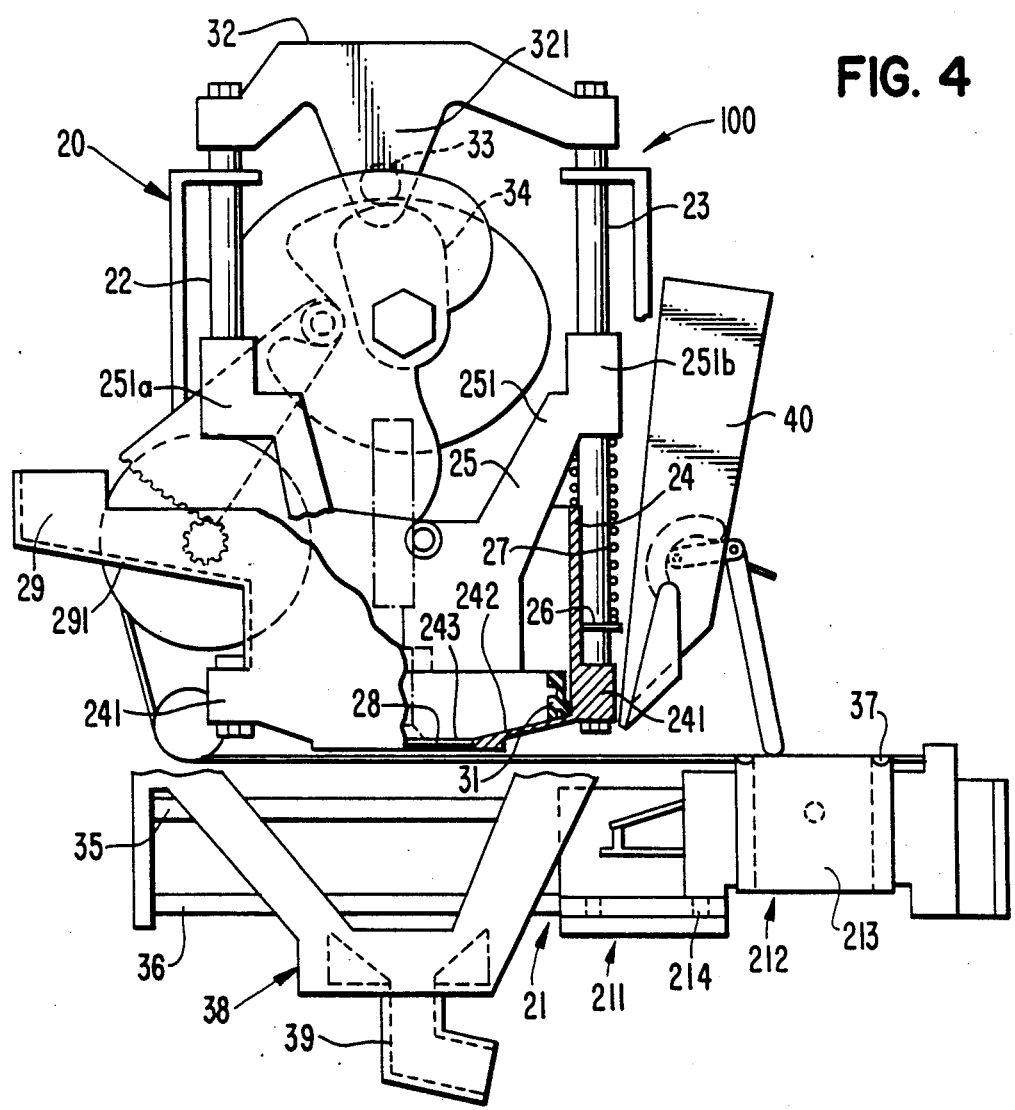
FIG. 4 is a partial sectional front view of a beverage brewing apparatus according to one embodiment of this invention.
Figure 5:
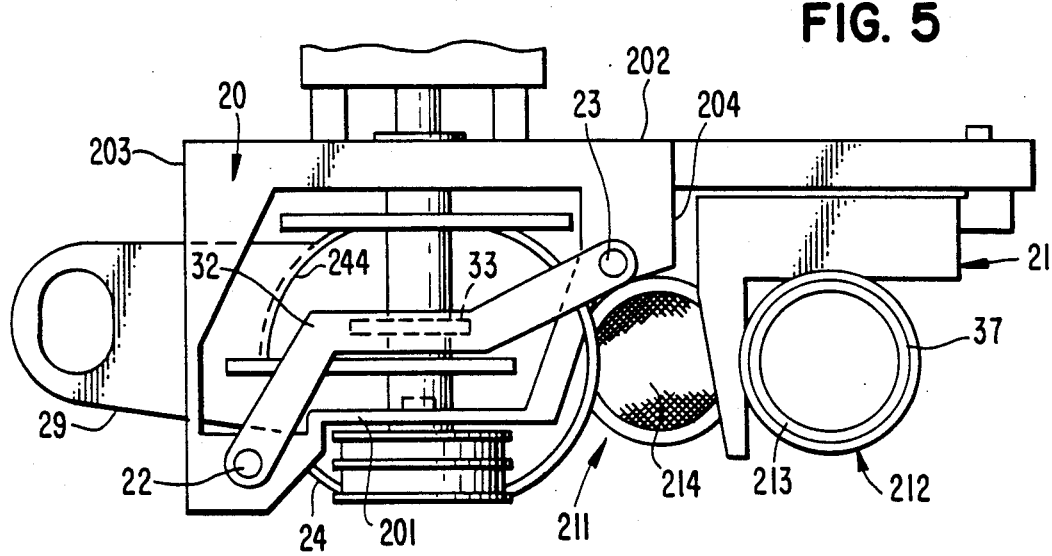
FIG. 5 is a plan view of the beverage brewing apparatus of FIG. 4.
Figure 6:
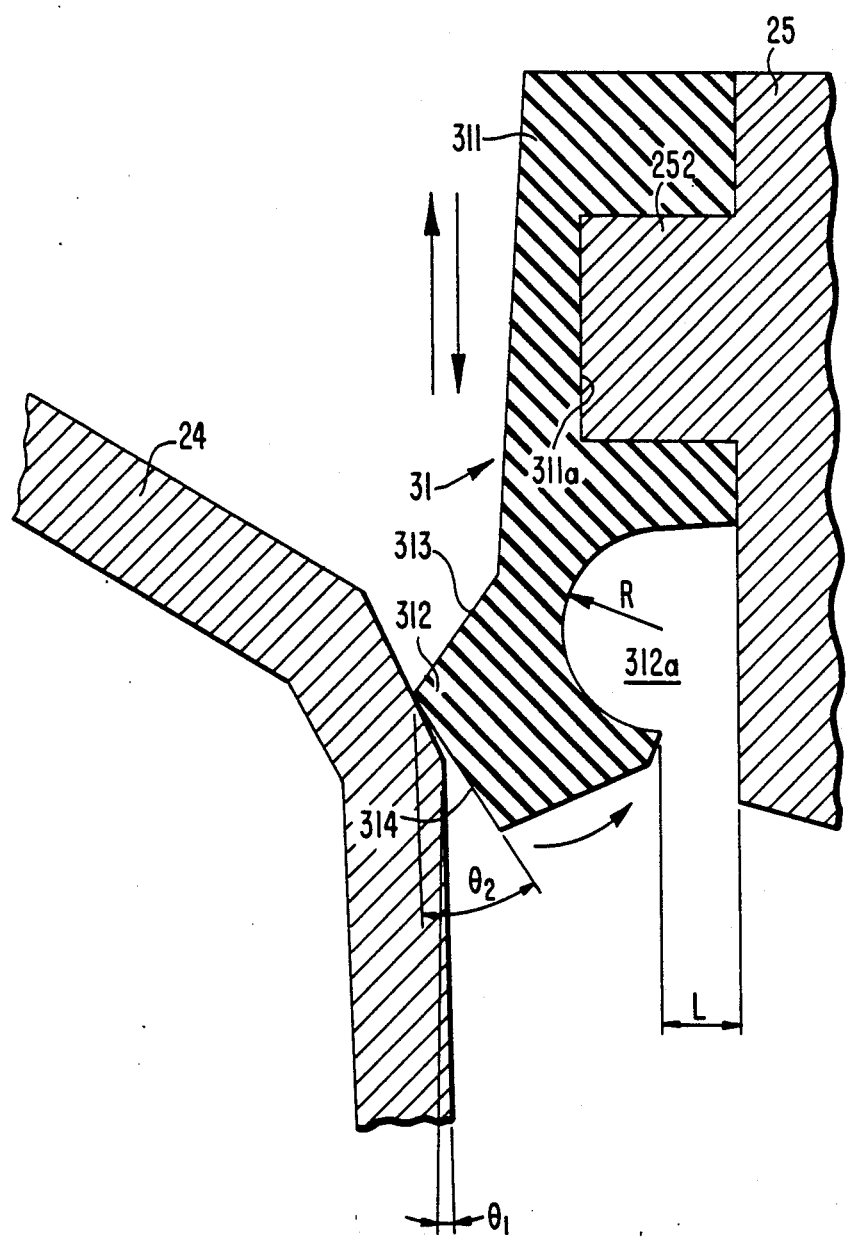
FIG. 6 is an enlarged sectional view of the beverage brewing apparatus to illustrate the configuration of the seal element utilized in FIG. 4.

Referring to FIGS. 4-6, a beverage brewing apparatus 100 in accordance with the present invention is shown. The brewing apparatus 100 includes a frame body 20 defined by a front wall 201, rear wall 202 and side walls 203 and 204 (FIG. 5). Rear wall 202 provides a base portion 21 including a filter supporting carriage 211 and brewing cavity carriage 212. The side walls 203 and 204 are used to maintain proper spaced relation between front and back walls 201 and 202.

A front guide rod 22 is mounted on front wall 201 and a rear guide rod 23 is supported on rear wall 202. Guide rods 22 and 23 are generally diagonally opposite one another within the frame body 20 and support a brewing cylinder 24 and piston 25.

Brewing cylinder 24 has a pair of supporting portions 241 projecting from an outer peripheral surface thereof. Cylinder 24 and supporting portions 241 are usually formed by an extrusion process to form these parts integral with one another. Each of the rods 22 and 23 extends vertically and is fixed to one of the supporting portions 241. Rod 23 is supported by a bearing support on rear wall 202 while rod 22 is supported by a corresponding bearing support on front walls 201. A snap ring 26 is fitted on each of guide rods 22 and 23, located above supporting portions 241 and a spring 27 surounds each of rods 22 and 23 at a location above snap ring 26. Thus, cylinder 24 is fixed to and movable with rods 22 and 23.

Cylinder 24 has a top opening and lower opening 243. Cylinder 24 also has a sloped bottom 242 which extends to the reduced diameter lower opening 243 and is coaxial therewith. The lower opening 243 is covered by a fine mesh screen 28 which is removably disposed within opening 243. This screen 28 prevents coffee grounds or other extracted material from entering into cylinder 24 together with the hot water while the brewing operation is in progress.

Cylinder 24 is provided with a series of inlet ports 244 at its upper inner periphery and a chute 29 extends from the outer peripheral surface of cylinder 24 communicating with the inlet ports 244. Chute 29 has a sloping bottom wall 291 which communicates with inlet ports 244 so that hot water may be introduced through chute 29 at a location below piston 25 when piston 25 is in its uppermost position.

Piston 25 remains at all times within cylinder 24 and has its upper end surface integrally connected to a U-shaped bridge 251. Each of the end 251a and 251b of bridge 251 is formed with a bore hole through which one of rods 22 and 23 extends. The upper ends of springs 27 which are disposed to surround rods 22 and 23, respectively, are contacted with the undersides of ends 251a and 251b of bridge 251. Springs 27 thereby apply a force between snap rings 26 and the ends 251a and 251b of bridge 251 for biasing piston 25 upwardly.

A seal element 31 is placed on the outer peripheral surface of piston 25 to effect sealing between cylinder 24 and piston 25.

As clearly shown in FIG. 6, seal element 31 comprises a ring portion 311 fitted on piston 25 and a flange portion 312 extending radially outwardly from the end portion of ring portion 311. Seal element 31 is supported on piston 25 by an interfitting construction between a radial projection 252 formed on the outer peripheral surface of piston 25 and a rectangular shaped groove 311a formed on the inner surface of ring portion 311 of seal element 31. The inner peripheral surface of flange portion 312 which is the connecting portion with ring portion 311 has semi-circular shaped space 312a defined a circular arc of radius R. This space 312a is at a distance L from the outer peripheral surface of piston 25. Therefore, this space 312a and the distance L are designed to free the operation of piston 25 and seal element 31 from deformation of seal element 31.

Also, the outer surface of flange portion 312 is formed with two flat surfaces 313 and 314, with the lowermost surface 314 having a slant angle $\theta_2$ relative to a vertical plane to decrease the presure imparted by the inner surface of cylinder 24 when piston 25 is moved downwardly within cylinder 24.

A cylinder operating bridge 32 has its end secured to the upper ends of rods 22 and 23, respectively. The arrangement is such that cylinder 24 being fixed on the lower ends of rods 22 and 23, and cylinder operating bridge 32 being fixed on the upper ends of rods 22 and 23 there is provided a positive fixed mounting system for ensuring parallelism of rods 22 and 23, and for ensuring smooth upward and downward movements of vertical arm 321 extending downwardly from bridge 32. Arm 321 of bridge 32 is provided with an opening in its lower end which rotatably supports a cam follower 33 on a support shaft on arm 321. Cam follower 33 cooperates with a cam 34.

Base portion 21 includes upper and lower rods 35 and 36 on which brewing cavity carriage 212 carrying brewing cavity 213 is slidably supported. Filter support carriage 211 in which filter 214 is removably disposed is also slidably supported on rods 35 and 36. Brewing cavity 213 has a groove formed in its upper surface to retain a seal element 37 which assures sealing between the lowermost surface of cylinder 24 and brewing cavity 213.

A funnel support 38 is disposed between the front and rear walls 201 and 202. A funnel 39 extends through and is supported by the funnel support 38. The top of funnel 39 has an outwardly extending rectangular flange. The bottom of funnel 39 merges into a tubular section formed with an elbow to change direction whereby liquid flowing therethrough may be finally directed to a cup for receiving the extracted beverage.

In the above described beverage brewing apparatus, upon initiation of an electrical input which may be in response to introducing a coin into a dispensing mechanism, the apparatus is energized. As the drive motor for the apparatus performs its driving functions, brewing cavity carriage 212 moves horizontally toward the left side in FIG. 4 through the operation of a cam element. When brewing cavity 213 is disposed above filter support carriage 211, a predetermined amount of ground coffee is supplied into brewing cavity 213 through coffee hopper 40. After the brewing cavity 213 receives the ground coffee, brewing cavity 213 continues to move toward the left side together with filter support carriage 211. When brewing cavity 213 is properly aligned beneath cylinder 24, movement of cavity 213 and support carriage 212 is stopped and cylinder 24 moves downwardly into tight engagement with cavity 213. The tight sealing between cylinder 24 and brewing cavity 213 is secured by sealing element 37 disposed on the upper surface of brewing cavity 213. Then, a predetermined amount of hot water is supplied into cylinder 24 through chute 29.

After the hot water is supplied into cylinder 24, piston 25 moves downwardly and, during this downward movement of piston 25, the ends 251a and 251b of U-shaped bridge 251 compress springs 27 surrounding guide rods 22 and 23 to ensure sealing of seal element 37 disposed on brewing cavity 213 with a seal element (not shown) placed between the lowermost opening of brewing cavity 213 and filter 214. During the brewing operation, springs 27 are continuously compressed by the downward movement of U-shaped bridge 251 to insure sealing between cylinder 24 and brewing cavity 213, and also sealing between cavity 213 and filter 214. After piston 25 has passed water inlet ports 244 on the upper inner wall surface of cylinder 24, a layer of sealed air is trapped between the top of the hot water surface and bottom face of piston 25.

Since the inner surface of cylinder 24 has a slant angle of $\theta_1$ to gradually reduce the inner diameter of the lower portion thereof, during the downward movement of piston 25, the frictional contact force of seal element 31 pressing against the inner surface of cylinder 24 is gradually increased to deform the flange portion 312 of seal element 31. However, this deformation of seal element 31 can be accommodated within the semi-circular shaped space 312a and the distance L between flange portion 312 and piston 25. Also, the pressing force acting against the flange portion 312 of seal element 31 from the inner surface of cylinder 24 is reduced by the lowermost slanted surface 314 of flange portion 312.

When piston 25 reaches a lowered position whereat all of the hot water has been forced through the ground coffee in brewing cavity 213, piston 25 continues downwardly at a slightly increased speed to force hot air through the spent ground coffee. Just prior to the end of its downward stroke, piston 24 approaches zero downward acceleration. The hot air passed through the spent ground coffee serves to dry out the grounds, thereby rendering them in a dry enough state so that they may be easily discharged. The extracted beverage is supplied to a cup (not shown) through funnel 39.

When piston 25 reaches the end of its downward stroke, cylinder 24 and piston 25 are moved slightly upwardly to clear the top flange on brewing cavity 213. Therefore, brewing cavity 213 is free to be easily released from the brewing position and moved toward the right side in FIG. 4. When filter support carriage 211 reaches a predetermined position, movement of the filter support carriage 211 is stopped, but brewing cavity carriage 212 continues its right side movement. After brewing cavity carriage 212 is separated from filter support carriage 211, the spent ground coffee in brewing cavity carriage 212 is discharged. Then, one brewing cycle has been completed.

This invention has been described in detail in connection with a preferred embodiment, but this is merely by way of example only and this invention is not to be considered as restricted thereto. It will be easily understood by those skilled in the art that other variations and modifications can be easily made within the scope of this invention.

What is claimed is:

1. In a beverage brewing apparatus including a vertically movable cylinder having an open top and an open bottom, a vertically movable piston member disposed in said cylinder and fitted with a seal element on an outer peripheral surface thereof to secure sealing between said cylinder and said piston, means for supply hot water into said cylinder below the elevation of said piston, a brewing cavity reciprocal horizontally between a brewing position and a discharge position, means to seal said brewing cavity with said cylinder in said brewing position, and ground beverage material supply means having a delivery opening positioned to supply beverage material into said brewing cavity when said brewing cavity is disposed at a material supply position, the improvement comprising said seal element comprising a ring portion supported on said outer peripheral surface of said piston, a flange portion extending radially outwardly from an end portion of said ring portion, a cut out space formed on an inner peripheral surface of the part of said flange portion which connects said flange portion with said ring portion, and an outer peripheral surface of said flange portion partly contacting with an inner surface of said cylinder and an inner peripheral surface of said flange portion being spaced a predetermined distance from said outer peripheral surface of said piston member.

2. The beverage brewing apparatus of claim 1 wherein said outer peripheral surface of said flange portion consists of two flat surfaces, and a lowermost one of said surfaces has a predetermined slant angle relative to a vertical plane.

* * * * *